July 22, 1958 R. L. WYCKOFF 2,844,763
COINCIDENCE TRIGGERED GATE GENERATOR
Filed Nov. 19, 1954 2 Sheets-Sheet 1

INVENTOR.
ROBERT L. WYCKOFF
BY George Sipkin
Lee J. Huntzberger
ATTORNEYS

July 22, 1958 R. L. WYCKOFF 2,844,763

COINCIDENCE TRIGGERED GATE GENERATOR

Filed Nov. 19, 1954 2 Sheets-Sheet 2

INVENTOR.
ROBERT L. WYCKOFF
BY George Sipkin
Lee J. Huntzberger
ATTORNEYS

United States Patent Office 2,844,763

Patented July 22, 1958

2,844,763

COINCIDENCE TRIGGERED GATE GENERATOR

Robert L. Wyckoff, Natick, Mass., assignor, by mesne assignments, to the United States of America as represented by the Secretary of the Navy Application November 19, 1954, Serial No. 470,147

5 Claims. (Cl. 315—166)

This invention relates to a coincidence triggered gate generator and more particularly to a coincidence triggered gate generator for controlling the flashing of the ship's heading marker on the plan position indicator of a radar equipment.

An object of this invention is to provide a coincidence triggered gate generator.

A further object is to provide a coincidence triggered gate generator for a ship's search radar set for controlling the flashing of the heading marker.

A further object is to provide a coincidence triggered gate generator for cyclically generating a fixed width gating pulse.

A further object is to provide a coincidence triggered gate generator for use with a cyclically movable mechanical element and a source of continual evenly-spaced short-duration trigger pulses for generating a gating pulse of pulse length equal to the period of the trigger pulses once during each cycle of movement of the mechanical element and at the same phase during each cycle.

A further object is to provide a coincidence triggered gate generator for use in producing the narrowest possible radial heading marker line on a P. P. I.

A further object is to provide a coincidence triggered gate generator which produces a gating pulse of sufficient amplitude to permit any one of a number of lossy mixing methods to be used in combining it with a video signal.

Figure 1:
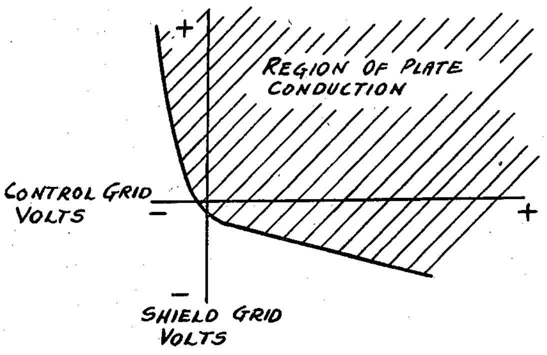
Figure 3:
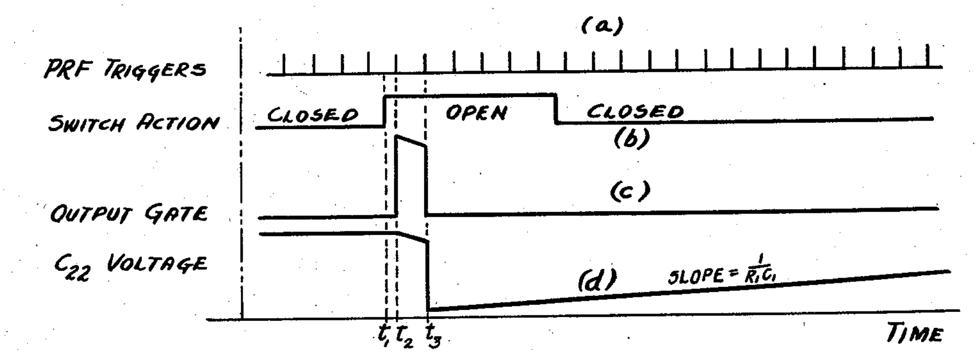
Figure 2:
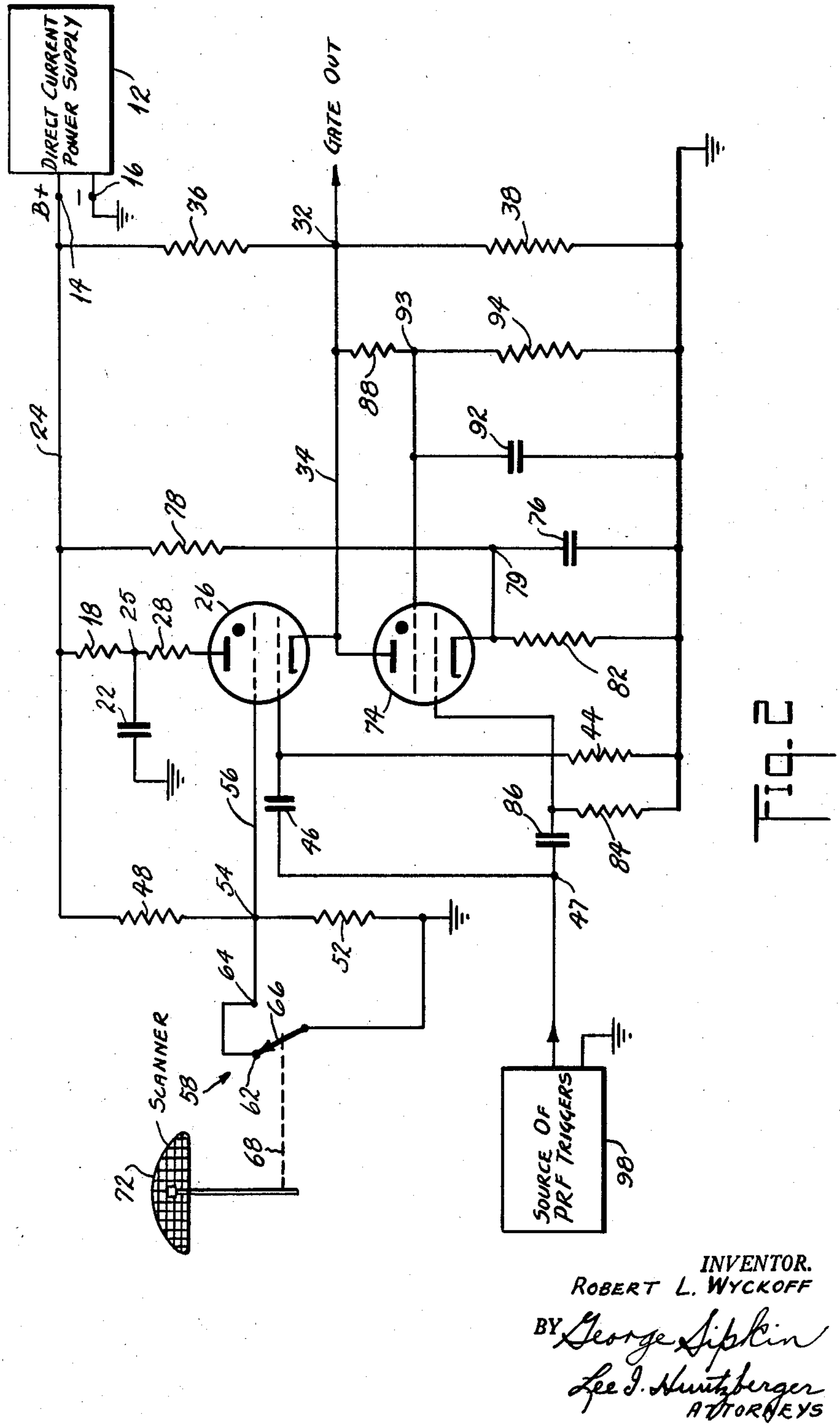

Other objects and many of the attendant advantages of this invention will be readily appreciated as the same becomes better understood by reference to the following detailed description when considered in connection with the accompanying drawings wherein:

Fig. 1 is a graphical plot indicating the relationship of control grid voltage and shield grid voltage to the initiation of plate conduction of a thyratron, Fig. 2 is a circuit diagram of a preferred embodiment of this invention with some parts shown in block form and including an associated scanner shown diagrammatically, and Fig. 3 includes four graphical plots for diagrammatically illustrating the action of the circuit Fig. 2.

This invention employs shield grid thyratrons of the type commonly identified by the commercial designation 2050, 2051 or 2D21. The graphical plot shown in Fig. 1 illustrates the threshold effect of control grid voltage and shield grid voltage on plate conduction in the thyratron. As evidenced by this graphical plot either the control grid or the shield grid of a shield grid thyratron can prevent the thyratron from becoming conductive, i. e., firing. In this invention an operating condition is selected for plate conduction which operating condition is defined by a particular control grid bias and a particular screen grid bias. In the quiescent condition of the thyratron both the control grid and the screen grid operate to prevent conduction due to the negative bias on each. Then the shield grid is raised to the bias of the operating condition to arm the thyratron for firing. Subsequent to that the control grid is raised to the bias of the operating condition and the thyratron fires. Two thyratrons are arranged whereby firing of one arms the second for firing.

In the succeeding description magnitudes are assigned to the circuit parameters. These magnitudes are intended as illustrative only of an embodiment of the invention. It is not intended that these magnitudes be construed in a limiting sense. Resort is had to conventional abbreviations. In referring to resistance, K stands for 1000 ohms. In referring to capacitance mfd. stands for microfarads.

The gate generator circuit includes a direct current power supply 12 (terminal voltage of 250 volts) and preferably regulated having a positive output terminal 14 and a negative output terminal 16. The negative output terminal 16 is conventionally connected to a common return path designated by the conventional symbol known as ground. A long time-constant energy storing circuit including a high resistance 18 (1 megohm) and a condenser 22 (1.0 mfd.) is connected across the terminals 14 and 16 of power supply 12 through a connecting lead 24 and through ground. The condenser 22 normally charges to the terminal voltage of power supply 12.

The discharge path for the condenser 22 includes a first shield grid thyratron 26. A current limiting resistor 28 (47 ohms) is connected to the discharge terminal 25 between the resistor 18 and condenser 22 and to the plate of the thyratron 26. The cathode of thyratron 26 is connected to circuit output terminal 32 through a connecting lead 34. The gating pulses are developed between the output terminal 32 and ground. A voltage divider circuit including a resistor 36 (470K) in series with a resistor 38 (10K) is connected across the output terminals 14 and 16 of power supply 12. The junction of resistors 36 and 38 coincides with output terminal 32. The cathode of thyratron 26 is positively biased by voltage divider 36, 38. A grid leak resistor 44 (51K) is connected between the control grid of thyratron 26 and ground; the control grid is biased negative. A coupling condenser 46 (0.000120 mfd.) is connected between circuit input terminal 47 and the control grid of thyratron 26. A second voltage divider including a resistor 48 (47K) in series with a resistor 52 (10K) and having an output terminal 54, is connected across the output terminals 14 and 16 of power supply 12. The screen grid of thyratron 26 is connected to output terminal 54 of the voltage divider. A normally-closed fast-acting switch 58 is connected in shunt across the resistor 52 to connect output terminal 54 to ground. The switch 58 includes a pair of commonly connected stationary contacts 62 and 64 and a movable contactor 66. Contactor 66 is normally in contact either with stationary contact 62 or stationary contact 64. When the switch 58 is closed the shield grid of thyratron 26 is at ground potential and therefore is biased negative to the same extent as is the control grid. This places the operating point for the quiescent condition in the lower left quadrant of Fig. 1, beyond the region of plate conduction. When the switch 58 is open-circuited the bias on the shield grid is driven substantially positive. The operating point is momentarily moved well up into the upper left quadrant of Fig. 1 but slightly to the left of the region of plate conduction. In other words the thyratron is armed for conduction and can be driven into the region of plate conduction by a momentary positive-going pulse coupled into the control grid for moving the operating point into the region of plate conduction.

The movable contactor 66 is operatively connected by means 68 conventional in the art to the scanner 72 of a ship's search radar equipment. Once each revolution of the scanner 72 and at the same phase in the cycle of revolution the switch 58 is momentarily opened as the contactor 66 is moved from one of the contacts 62, 64 to the other of the contacts. When the switch 58 is closed as is the case during most of each cycle of revolution of the scanner 72 the shield grid of the thyratron 26 is at ground potential and therefore is effectively biased negative.

A second shield grid thyratron 74 is connected in series with the thyratron 26. A condenser 76 (25 mfd.) of much greater capacitance than condenser 22 is connected between the cathode of thyratron 74 and ground. Since the capacitance of condenser 76 is so much greater than that of condenser 22, condenser 22 is adapted to discharge through the thyratrons 26 and 74 into the condenser 76 to a voltage level which can no longer sustain conduction of the thyratrons. Current limiting resistor 28 is small enough to permit this to occur substantially instantaneously. Resistor 18 has too much resistance to permit sustained conduction of current from the power supply 12 through the thyratrons 26 and 82. In other words when a current path is opened through thyratrons 26 and 74 both the thyratrons 26 and 74 become nonconductive substantially instantaneously.

A voltage divider including a resistor 78 in series with a resistor 82 and including an output terminal 79 is connected across the terminals 14 and 16 of power supply 12. The cathode of the thyratron 74 is connected to the output terminal 79 and thereby is biased slightly more positive than the cathode of thyratron 26. Resistor 82 serves an additional function of providing a discharge path for the condenser 76 immediately after the thyratrons 26 and 74 stop conducting.

A grid leak resistor 84 (51K) is connected between the control grid of thyratron 74 and ground whereby the control grid is biased negative. A coupling condenser 86 (0.000120 mfd.) is connected between circuit input terminal 47 and the control grid of thyratron 74. A voltage divider in the form of a long time-constant integrating circuit and consisting of a resistor 88 (1 megohm) in series with a condenser 92 (0.01 mfd.) and having an output terminal 93 is connected between the cathode of thyratron 26 and ground. The screen grid of thyratron 74 is connected to the output terminal 93. A discharge resistor 94 (33K) is connected across the condenser 92. Normally the condenser 92 is virtually uncharged because the ratio of the resistances of [resistor 94/resistor 94 plus 88] multiplied by the ratio of the resistances of [resistor 38/resistor 38 plus 36] is very small. Therefore the screen grid of the thyratron is substantially at ground potential. When the thyratron 26 becomes conductive the potential of its cathode rises to substantially the potential to which condenser 22 is charged. The condenser 22 begins to discharge through the thyratron 26 and partially through resistor 38 which serves as load resistor as well as part of a voltage divider. The condenser 22 concurrently discharges partially into condenser 92 to raise the potential of the screen grid of thyratron 74 sufficiently to arm the latter for firing after a predetermined time delay. Before the thyratron 26 fires the shield grid of the thyratron 74 is virtually at ground potential and is therefore biased negative to substantially the same extent as is the control grid of thyratron 74. This places the operating point for the quiescent condition in the lower left quadrant of Fig. 1 beyond the region of plate conduction. When the thyratron 26 fires the bias on the shield grid of thyratron 74 is driven positive into the upper left quadrant of Fig. 1 and after a predetermined time delay to a level where the thyratron is armed for conduction (firing) and adapted to be triggered for moving the operating point into the region of plate conduction by a momentary positive going trigger pulse of predetermined amplitude coupled into its control grid.

A source of pulse repetition frequency trigger pulse is connected between the input terminal 47 of the circuit and ground. The latter generates a continual series of direct current trigger pulses of constant amplitude, short duration and constant repetition frequency. When the thyratrons are armed for firing as described above, the coupling of a trigger pulse from the source 98 to the control grids causes the armed thyratron to fire.

Between the instant the thyratron 26 is fired until a succeeding trigger pulse from source 98 causes thyratron 74 to fire the voltage at output terminal 32 is substantially constant and substantially equal to the terminal voltage of power supply 12. When the thyratron 74 fires the condenser 22 discharges substantially instantaneously into condenser 76 to a potential level which does not support conduction through thyratron 26 and 74. The voltage at output terminal 32 drops back substantially instantaneously. The length of the substantially rectangular gating pulse formed at output terminal 32 is equal to the period of the trigger pulses from source 98.

In operation, the coincidence triggered gate generator circuit goes through four states during each cycle of operation. In the first state the conditions are stable. This is shown on the left hand side of Fig. 3. Immediately preceding the brief open-circuiting of the switch 58 neither thyratron 26 nor thyratron 74 is conducting. Thyratron 26 cannot respond to the input trigger pulses on its control grid because of the bias on its shield grid obtained by fixed cathode bias from the voltage divider 36, 38. The thyratron 74 cannot respond to the trigger pulses on its control grid because it does not have sufficient plate voltage.

The second state occurs at time *t1* (Fig. 3). The switch 58 opens briefly (Fig. 3(*b*)). Coincidentally with the opening of the switch 58 the screen grid of thyratron 26 assumes a new bias which is sufficiently positive to arm the thyratron 26 for firing when the next trigger pulse arrives from the source 98 at the control grid of the thyratron 26.

The third state of the circuit occurs at time *t2* (Fig. 3) when a trigger pulse from source 98 is coupled into the control grid of thyratron 26 which is already armed by the open-circuiting of the switch 58. This causes the thyratron 26 to conduct. Its cathode and therefore the output terminal 32 and the plate of the thyratron 74 rise to very nearly the plate supply voltage stored in condenser 22 (Fig. 3(*c*)). A portion of this voltage step is delayed and applied to the screen grid of the thyratron 74 through the long time-constant circuit including resistor 88 and condenser 92 in order to arm the thyratron 74 for firing when the next trigger pulse arrives from the source 98 at its control grid. The delay is necessary in order to prevent the thyratron 74 from firing as soon as its plate voltage goes positive i. e., at the same instant thyratron 26 fires. The capacitance of condenser 22 is great enough to supply fairly constant current to the load 38 for the expected duration of the gate developed between the terminal 32 and ground. It is the gradual discharge of condenser 22 through the thyratron 26 to the load 38 which causes the conditions during this state to be but quasi-stable.

In the fourth state of the circuit the conditions are likewise quasi-stable. The fourth state occurs at time *t3* (Fig. 3) at which time a second trigger pulse arrives from the source 98 at the control grid of the thyratron 74 which has been previously armed with the appropriate plate and screen grid voltages. When the thyratron 74 fires, heavy current flows through condenser 22, thyratron 26, thyratron 74, and condenser 76. Since thyratrons 26 and 74 may be considered to be short circuited while conducting, the energy stored in condenser 22 is shared with condenser 76. By making the capacitance of condenser 76 many times greater than the capacitance of condenser 22, condenser 76 is able to discharge the voltage on condenser 22 to a value low enough to permit thyratrons 26 and 74 to extinguish substantially instantaneously. The current through resistor 18 is too low to support ionization in the thyratrons by current flow from the power supply 12. This state is only quasi-stable because the voltages on the condensers 22 and 76 are very different from those found in the first state. The condenser 76 must discharge slightly because it has taken energy from condenser 22. Condenser 22 must charge up because it has delivered energy to the load 38 during the interval of the gating pulse and to condenser 76 at the end of the gating pulse. By making the charging time of condenser 22 long enough (Fig. 3*d*) to delay application of plate voltage to thyratron 26 until switch 58 has closed, the circuit operates only once each time the switch 58 is actuated even though the switch may remain open for a number of trigger pulse intervals. The function of the high resistance of resistor 18, thus is twofold; it permits the thyratrons to extinguish themselves and also slows the recovery of the circuit so that it cannot be triggered again for a fairly long time i. e., until the switch 58 has closed and then opened again. After the voltages on condenser 22 and condenser 76 have stabilized the circuit is in the same state as the first state above and is ready for another opening of the switch 58 to repeat the cycle for generating another gating pulse.

This circuit is particularly suitable for use as a ship's heading flasher for the P. P. I. of a ship's search radar set. First, the duration of the flash of the ship's heading marker is automatically equal to one P. R. F. interval thus producing the narrowest possible radial marker line on a P. P. I. regardless of the antenna rotation rate and the erratic duration of the open-circuiting of switch 58 used to initiate the ship's heading flash on the P. P. I. Then, if the gating pulse from this circuit is D. C. coupled in a suitable manner to the cathode ray tube of the P. P. I. there is no overshoot at the end of the gating pulse interval to blank out the P. P. I. briefly. Finally, the amplitude of the gating pulse is very high being very nearly equal to the plate supply voltage. This allows any one of a number of lossy mixing methods to be used to combine the gating pulse with a video signal.

Obviously many modifications and variations of the present invention are possible in the light of the above teachings. It is therefore to be understood that within the scope of the appended claims the invention may be practiced otherwise than as specifically described.

I claim:

1. A coincidence triggered gate generator comprising a first electrical common; a second electrical common; a series-connected high resistance and first large condenser connected between said first and second electrical commons; a first shield grid thyratron; a current limiting resistor connected between the plate of said first thyratron and the junction between said high resistance and said first condenser; a normally-closed switch which when actuated is open-circuited for an instant, said switch being connected between the screen grid of said first thyratron and said second electrical common; a second screen grid thyratron connected in series with said first thyratron; a second large condenser several times the size of said first condenser connected between the cathode of said second thyratron and said second electrical common; resistive voltage divider means connected between said first electrical common and said second electrical common; the screen grid and cathode of said first thyratron and of said second thyratron being connected to said voltage divider means, a first input grid resistor and a second input grid resistor connected between said second electrical common and the control grids of said first thyratron and said second thyratron respectively; a small condenser connected between the screen grid of said second thyratron and said second electrical common; said first and second electrical commons being adapted to be connected to a direct current power supply; the control grids of said thyratrons being adapted to be coupled to a source of continual evenly-spaced short duration pulses; said switch being adapted to be actuated by a cyclically movable member; whereby the control grid to cathode bias and the screen grid to cathode bias of said thyratrons normally prevent initiation of conduction therethrough, but when said switch is actuated and a trigger pulse is coupled to the control grid of said first thyratron, said first thyratron conducts permitting said small condenser to charge to arm said second thyratron for conduction and when a succeeding trigger pulse is coupled to the control grid of said second thyratron, said second thyratron conducts permitting said second condenser to charge, both thyratrons becoming automatically extinguished when said first condenser discharges to a voltage at which it cannot sustain conduction in the thyratrons, whereby there is generated a steep-sided pulse at the cathode of said first thyratron whose length is equal to the period of the trigger pulses.

2. A coincidence triggered gate generator comprising a first electrical common; a second electrical common; a series-connected high resistance and first large condenser connected between said first and second electrical commons; a first thyratron having a control grid; a current limiting resistor connected between the plate of said first thyratron and the junction between said high resistance and said first condenser; a second thyratron having a control grid and a shield grid; said second thyratron connected in series with said first thyratron; a second large condenser of several times the size of said first condenser connected between the cathode of said second thyratron and said second electrical common; resistive voltage divider means connected between said first electrical common and said second electrical common; the cathode of said first thyratron and of said second thyratron and the screen grid of said second thyratron being connected to said voltage divider means, a first input grid resistor and a second input grid resistor connected between said second electrical common and the control grids of said first thyratron and said second thyratron respectively; a small condenser connected between the screen grid of said second thyratron and said second electrical common; said first and second electrical commons being adapted to be connected to a direct current power supply; the control grids of said thyratrons being adapted to be coupled to a source of a pair of closely spaced trigger pulses; whereby the control grid to cathode bias of said first thyratron and the control grid to cathode bias and the screen grid to cathode bias of said second thyratron normally prevent initiation of conduction therethrough, and whereby when a trigger pulse is coupled to the control grid of said first thyratron, said first thyratron conducts permitting said small condenser to be charged to arm said second thyratron for conduction and when a closely following trigger pulse is coupled to the control grid of said second thyratron, said second thyratron conducts, both thyratrons becoming automatically extinguished when said first condenser discharges to a voltage at which it cannot sustain conduction whereby there is generated a steep sided pulse at the cathode of said first thyratron which is initiated by a first trigger pulse and extinguished by a second trigger pulse.

3. A gate pulse generator for use with a direct current power supply, comprising: a first electrical common and a second electrical common for connection to the positive and negative terminals respectively of the direct current power supply; a series-connected first resistance and first condenser connected at the resistance end to said first electrical common and connected at the condenser end to said second electrical common; first and second gaseous discharge tubes each having an anode, a cathode, and an electrode for controlling initiation of conduction; a gate pulse output terminal connected in common with the cathode of said first tube and the anode of said second tube; a second condenser having several times the capacitance of said first condenser; conductive means including a current surge limiting resistance connecting the anode of said first tube to the junction of said first resistance and first condenser and connecting the cathode of said second tube to one end of said second condenser and connecting the other end of said second condenser to said second electrical common; means connected to at least one of said electrical commons and to the control electrode and cathode of each of said tubes for establishing cutoff bias on the control electrode of each of said tubes and for establishing a voltage between the anode and cathode of said first tube which is a fraction of the voltage between said electrical commons but which is in excess of that voltage needed for commencing conduction through said first tube after initiation of conduction by the control electrode thereof; said first resistance being of such magnitude that when cut-off bias on the control electrode of said first tube is removed said first tube does not conduct unless said first condenser is charged sufficiently to commence to drive current through said first tube; said means including a resistive path between the cathode of said first tube and said second electrical common for carrying current that passes through said first tube when said second tube is nonconductive, and also including a resistive path across said second condenser to discharge the latter; whereby when said electrical commons are connected to a direct current power supply and the control electrode of said first tube is raised above cut-off bias said first condenser commences to discharge through said first tube and the voltage at said gate pulse output terminal rises substantially instantaneously to substantially the voltage on said first condenser, and if the control electrode of said second tube is raised above cut-off before said first condenser discharges to the level where it cannot commence to drive current through said second tube, said first condenser discharges through both said tubes to the level where both said tubes are cut off substantially instantaneously and concurrently with removal of cut-off bias from said second tube and the voltage at said gate pulse output terminal drops back to the voltage level it was at before said first tube was rendered conductive, the width of the gate pulse at said gate pulse output terminal being equal to the interval between beginning and ending of conduction through said first tube, the minimum interval between gate pulses from said gate generator being the time needed for said first condenser to charge from the voltage level where said first tube is cut off to the voltage level needed before said first condenser is able to commence to again drive current through said first tube.

4. A gate pulse generator for use with a direct current power supply, and a first periodic pulsing means, and a second periodic pulsing means, wherein the periodicity of said first pulsing means is many times longer than the periodicity of said second pulsing means and wherein the time width of the pulsing portion of the periodicity of said first pulsing means is greater than three times the periodicity of said second pulsing means, said pulse generator comprising: a first electrical common and a second electrical common for connection to the positive and negative terminals respectively of the direct current power supply; a series-connected first resistance and first condenser connected at the resistance end to said first electrical common and connected at the condenser end to said second electrical common, the time constant thereof being such that the condenser can only be charged a very small percentage of full charge during one period of said second pulsing means; a first gaseous discharge tube having an anode, a cathode, and two electrodes for controlling initiation of conduction; a second gaseous discharge tube having an anode, a cathode, and an electrode for controlling initiation of conduction; a gate pulse output terminal connected in common with the cathode of said first tube and the anode of said second tube; a second condenser having several times the capacitance of said first condenser; conductive means including a current surge limiting resistance connecting the anode of said first tube to the junction of said first resistance and said first condenser, and connecting the cathode of said second tube to one end of said second condenser, and connecting the other end of said second condenser to said second electrical common; means connected to at least one of said electrical commons and to the control electrodes and cathodes of said tubes for establishing cut-off bias on the control electrodes of both said tubes and for establishing a voltage between the anode and cathode of said first tube which is a fraction of the voltage between said electrical commons but which is in excess of the voltage required for commencing conduction through said first tube after initiation of conduction by the control electrodes thereof; said first resistance being of such magnitude that when the cut-off bias on both control electrodes of said first tube is removed said first tube does not conduct unless said first condenser is charged sufficiently to commence to drive current through said first tube, the time required for charging said first condenser sufficiently being longer than the pulsing action time of said first pulsing means; said cut-off bias establishing means including a resistive path between the cathode of said first tube and said second electrical common for carrying current that passes through said first tube when said second tube is nonconductive, and also including a resistive path across said second condenser to discharge the latter; whereby when said electrical commons are connected to the direct current power supply, and said first pulsing means periodically raise the bias on that electrode above cut-off, and said second pulsing means raises the other control electrode of said first tube above cut-off and with a succeeding pulse raises the control electrode of said second tube above cut-off, one gating pulse only is generated at said gate pulse output terminal during each pulsing action of said first pulsing means, because after said first condenser is discharged through said tubes to provide a gate pulse during a pulsing action of said first pulsing means, said first condenser cannot recharge sufficiently to again drive current through said tubes during the same pulsing action of said first pulsing means, and whereby the width of each gating pulse is substantially equal to the periodicity of said second pulsing means.

5. A gate pulse generator for use with a direct current power supply and with a source of closely spaced trigger pulses, said pulse generator comprising: a first electrical common and a second electrical common for connection to the positive and negative terminals respectively of the direct current power supply; a series connected first resistance and first condenser connected at the resistance end to said first electrical common and connected at the condenser end to said second electrical common; a first gaseous discharge tube having an anode, a cathode, and an electrode for controlling initiation of conduction; a second gaseous discharge tube having an anode, a cathode, and two electrodes for controlling initiation of conduction; a gate pulse output terminal connected in common with the cathode of said first tube and the anode of said second tube; a second condenser having several times the capacitance of said first condenser; conductive means including a current surge limiting resistance connecting the anode of said first tube to the junction of said first resistance and said first condenser, and connecting the cathode of said second tube to one end of said second condenser, and connecting the other end of said second condenser to said second electrical common; means connected to at least one of said electrical commons and to the control electrodes and cathodes of said tubes for establishing cut-off bias on the control electrodes of both said tubes and for establishing a voltage between the anode and cathode of said first tube which is a fraction of the voltage between said electrical commons but which is in excess of the voltage required for commencing conduction through said first tube after initiation of conduction by the control electrode thereof; said first resistance being of such magnitude that when the cut-off bias on the control electrode of said first tube is removed said first tube does not conduct unless said first condenser is charged sufficiently to commence to drive current through said first tube; said cut-off bias establishing means including a second resistance between the cathode of said first tube and said second electrical common for carrying current that passes through said first tube when said second tube is nonconductive, and also including a resistive path across said second condenser to discharge the latter; one of the control electrodes of said second tube being connected to said second resistance intermediate the ends thereof; a small condenser connected at one end to said one of said control electrodes and at the other end to said second electrical common; whereby when said electrical commons are connected to the direct current power supply, and a pulse from the trigger pulse source raises the bias on the control electrode of said first tube above cut-off; said first tube conducts permitting said third condenser to charge to raise said one control electrode of said second tube above cut-off and when a closely following pulse from said pulse source then raises the other control grid of said second tube above cut-off, said second tube conducts and both said tubes are cut off substantially instantaneously whereby there is generated a steep sided gate pulse at said gate pulse output terminal which is initiated by one trigger pulse and terminated by a closely following trigger pulse, the minimum interval between gating pulses being directly related to the time constant of said first resistance and said first condenser.

References Cited in the file of this patent

UNITED STATES PATENTS

| | | |
|---|---|---|
| 2,419,590 | Preisman | Apr. 29, 1947 |
| 2,457,176 | Preisman | Dec. 28, 1948 |
| 2,509,269 | Hana | May 30, 1950 |
| 2,517,635 | Darden | Aug. 8, 1950 |
| 2,644,112 | Desch | June 30, 1953 |

FOREIGN PATENTS

| | | |
|---|---|---|
| 677,571 | Great Britain | Aug. 20, 1952 |